June 16, 1942.  A. P. WOOD  2,286,702
DYNAMO-ELECTRIC MACHINE
Filed Nov. 28, 1940
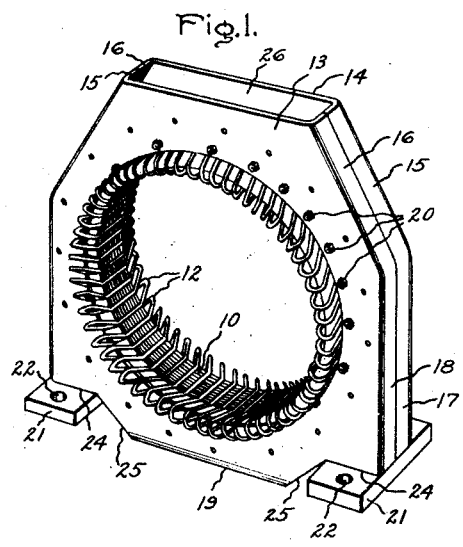
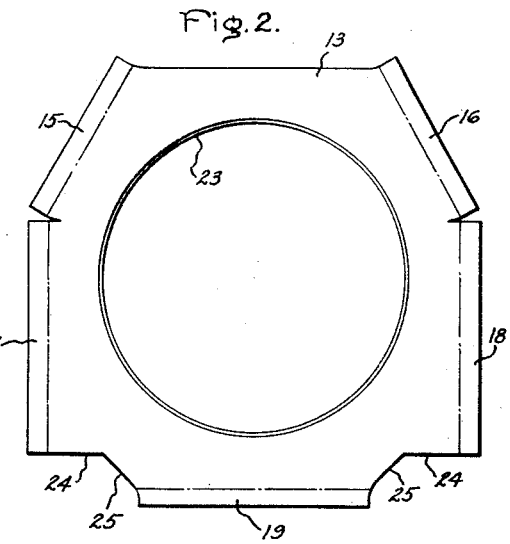
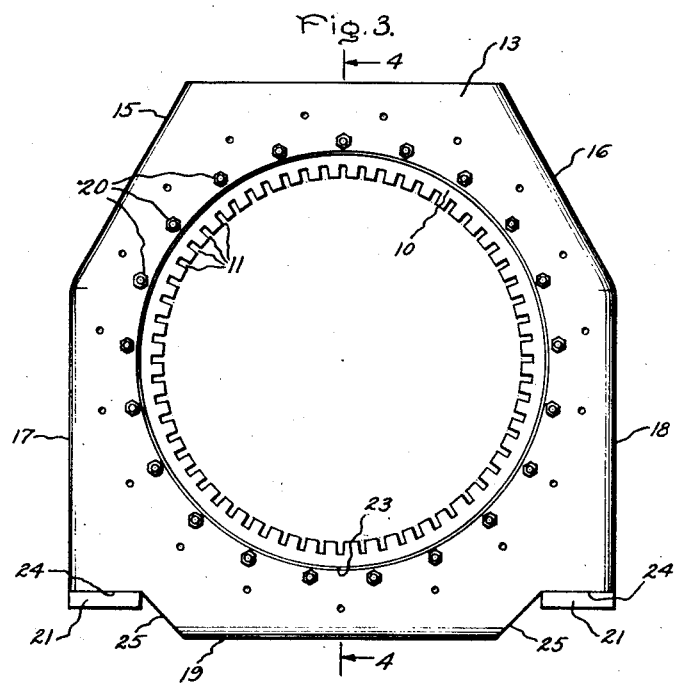
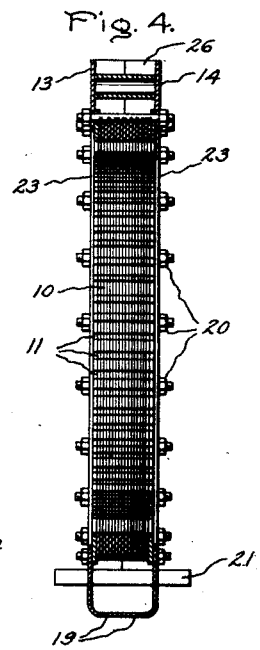
Inventor:
Alexander P. Wood,
by Harry E. Dunham
His Attorney.

Patented June 16, 1942

2,286,702

UNITED STATES PATENT OFFICE 2,286,702

DYNAMOELECTRIC MACHINE

Alexander P. Wood, Schenectady, N. Y., assignor to General Electric Company, a corporation of New York Application November 28, 1940, Serial No. 367,551

2 Claims. (Cl. 171—252)

My invention relates to improvements in dynamo-electric machines and particularly to a fabricated construction for the stationary member of dynamo-electric machines and a method of making the same.

An object of my invention is to provide an improved and simplified unitary fabricated stationary member for a dynamo-electric machine and a method of making the same.

Another object of my invention is to provide an improved and simplified fabricated dynamo-electric machine member frame structure.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a perspective view of a stationary member of a dynamo-electric machine embodying my invention; Fig. 2 is a plan view of a sheet metal stamping from which one-half of the stationary member frame may be made; Fig. 3 is a side elevational view of the dynamo-electric machine stationary frame and core shown in Fig. 1; and Fig. 4 is a sectional view taken along line 4—4 of Fig. 3.

In the drawing I have shown my invention in connection with a dynamo-electric machine having a stationary member laminated core 10 provided with winding slots 11 in which a winding 12 is arranged. This stationary member core and the winding are supported by a frame including a pair of complementary cup-shaped members having end sections 13 and 14 arranged about each end of the machine and having complementary side elements 15, 16, 17, 18, and 19 on each cup-shaped member, which extend angularly from the end sections and about the ends of the laminated core. Each of the frame side elements extends substantially one-half the width of the side of the machine with adjacent edges arranged in substantially abutting relationship forming substantially closed sides about the core. The two cup-shaped members are secured together by welding together the abutting edges of the sides thereof to provide a rigid frame structure, and the core 10 is secured in position within the frame by a plurality of circumferentially spaced apart bolts 20. The frame is adapted to be supported in an upright position by a pair of feet 21 welded one to each side of the frame structure and provided with bolt holes 22 for securing the feet in position upon any suitable foundation.

In fabricating the stationary member, the frame is made by stamping or punching a sheet metal blank as shown in Fig. 2 with an opening 23 in the central portion thereof to accommodate the rotatable member of the dynamo-electric machine and allow for the radial projection therethrough of the core teeth and winding slots into which the winding of the stationary member is arranged. The inner portion of the sheet metal blank forms the end section of each cup-shaped member of the frame, and outwardly extending side sheet elements 15, 16, 17, 18, and 19 are formed integral with the side sections 13 and are punched in the desired relationship, as more particularly shown in Fig. 2. These frame side elements then are bent along the dot-dash lines substantially at right angles to the end section 13 such that the corresponding sides of each pair of frame members extend in opposite directions towards each other from the end sections. These frame members then are arranged about an assembly of laminations forming the core 10 and are bolted in the desired position with adjacent edges of corresponding enclosing sides in abutting relationship as shown in Fig. 1. These abutting edges then are welded together to provide a rigid frame structure extending about the sides of the core. The feet 21 then are arranged transversely of the frame edges 24 and are welded to the frame to provide a unitary structure. Openings are formed between the edges 25 in the lower portion of the frame adjacent the feet 21 and provide passages through which the ventilating medium may be blown in order to cool the stationary member of the machine. The frame is not provided with upper sides, so that another opening 26 is formed through which ventilating medium may be blown in order further to dissipate the heat generated in the stationary member of the machine.

While I have illustrated and described a particular embodiment and method of carrying out my invention, modifications thereof will occur to those skilled in the art. I desire it to be understood, therefore, that my invention is not to be limited to the particular arrangement and method disclosed, and I intend in the appended claims to cover all modifications which do not depart from the spirit and scope of my invention.

What I claim as new and desire to secure by Letters Patent of the United States is:

1. A stationary member for a dynamo-electric machine including a laminated core having winding slots with a winding therein, a sheet metal frame arranged about said core and including a pair of complementary substantially cup-shaped members each having an end section with an opening therein adapted to accommodate a rotatable member of the machine and having frame sides extending axially about the major portion of the periphery of said core, with adjacent edges thereof arranged substantially in abutting relationship, means for securing together said adjacent edges, and means for securing said core in position in said frame.

2. A stationary member for a dynamo-electric machine including a laminated core having winding slots with a winding therein, a sheet metal frame arranged about said core and including a pair of complementary substantially cup-shaped members each having an end section with an opening therein to accommodate a rotatable member of the machine and the stationary member winding and having frame side elements extending axially about the major portion of the periphery of said core, with edges arranged substantially in abutting relationship, said edges being secured together by welding.

ALEXANDER P. WOOD.